(12) United States Patent
Scheidegg

(10) Patent No.: US 6,402,330 B1
(45) Date of Patent: Jun. 11, 2002

(54) SIDE-VIEW MIRROR TENSIONER

(76) Inventor: Robert Scheidegg, 14 Ridgewood Cir., Wilmington, DE (US) 19009

( * ) Notice: Subject to any disclaimer, the term of this patent is extended or adjusted under 35 U.S.C. 154(b) by 0 days.

(21) Appl. No.: 09/839,756

(22) Filed: Apr. 20, 2001

(51) Int. Cl.[7] .............................................. G02B 7/182
(52) U.S. Cl. ....................... 359/879; 359/880; 359/871; 359/872
(58) Field of Search .................. 359/879, 880, 359/871, 872, 838, 850, 851; 248/479, 549, 486, 282, 289.3

(56) References Cited

U.S. PATENT DOCUMENTS

| | | | | |
|---|---|---|---|---|
| 4,125,244 A | * | 11/1978 | Lukey ..................... | 248/475 B |
| 4,166,651 A | * | 9/1979 | Vandenbrink et al. .... | 296/84 B |
| 4,182,182 A | * | 1/1980 | Stortz ....................... | 73/343 R |
| 5,028,029 A | * | 7/1991 | Beck et al. ................ | 248/479 |
| 6,028,563 A | * | 2/2000 | Higgins ..................... | 343/797 |

* cited by examiner

Primary Examiner—Mohammad Sikder
(74) Attorney, Agent, or Firm—Ratner & Prestia

(57) ABSTRACT

A tensioner to provide resistance to rotation of a shaft relative to a surface from which the shaft originates. The tensioner comprise a shaft collar split into at least two pieces; at least one connector for fastening the split pieces of the shaft collar together about the shaft; and a bushing split into at least two pieces. The bushing is adapted to contact an interface between the shaft and the surface from which the shaft originates. At least one axially adjustable member corresponding to each bushing piece and having a corresponding axial guide within the shaft collar is insertable in the corresponding axial guide and adjustable to exert pressure upon the bushing to push the bushing into or against the interface. The tensioner may be adapted specifically for use with a side-view mirror shaft, such as is commonly found on pick-up trucks and the like, and may be adaptable for use in configurations with or without grommets as the interface between the shaft and a mounting bracket for the shaft.

22 Claims, 4 Drawing Sheets

SIDE-VIEW MIRROR TENSIONER

TECHNICAL FIELD

This invention relates to mirrors for automobiles, and particularly to a device to provide resistance to movement of a side-view mirror so that once set in a particular position, the mirrors will stay in that position until manually adjusted again.

BACKGROUND OF THE INVENTION

A number of automobiles on the road, in particular pick-up trucks of various makes and models and other vehicles made from pick-up truck platforms, such as sport-utility vehicles (SUVs), have side-view mirrors like those shown in FIG. 1. As shown in FIG. 1, an exemplary side view mirror assembly 10 comprises the mirror housing 12, a shaft 14, and a mirror assembly mounting bracket 16 that attaches to the truck body 18. Grommets 20a and 20b, such as made of rubber or the like, typically are mounted on either end of the shaft at the interfaces with the mirror housing and mounting bracket, respectively. Sometimes one or both of grommets 20a and 20b may become lost, or the portion of the grommet that protrudes from the recess 21 in mounting bracket 16 into which shaft 14 is inserted, may become torn off.

The side-view mirror is typically set in one place by a driver depending upon his or her height and preference for how to view the road. When another driver of a different height or having a different set of preferences drives the vehicle, the other driver may adjust the mirror to a different position by twisting mirror shaft along axis Y, by twisting mirror housing along axis X, or both. Pick-up trucks in particular are frequently used for pulling trailers, such as boats, camping trailers, horse trailers, and the like, requiring the mirrors to be adjusted for the overall length of the vehicle with the trailer, and then back again when the trailer is unhitched. Owners of such vehicles typically keep the vehicles in service for a long time. The repeated movement of the mirrors back and forth may eventually cause wear that makes the mirrors no longer resistant enough to adjustment to keep them from moving on their own as a result of vibration or wind resistance. In addition to being a nuisance for the vehicle owner who has to repeatedly adjust his or her mirror, the inability of the mirror to stay in position may also pose a safety concern. Thus, owners of such vehicles may be forced to entirely replace the mirror assembly, which can be expensive, and somewhat wasteful, since the mirror assembly is otherwise often not in need of replacement, except for the lack of resistance to adjustment.

There is therefore a need in the art for an inexpensive mirror tensioning device that can be placed on an existing mirror assembly to increase resistance without having to entirely replace the mirrors.

SUMMARY OF THE INVENTION

In accordance with this invention, there is provided a tensioner to provide resistance to rotation of a shaft relative to a surface from which the shaft originates. The tensioner comprises a shaft collar split into at least two pieces; at least one connector for fastening the split pieces of the shaft collar together about the shaft; and a bushing split into at least two pieces. The bushing is adapted to contact an interface between the shaft and the surface from which the shaft originates. At least a portion of the bushing is adapted to fit coaxially inside and be radially constrained by the shaft collar. At least one axially adjustable member, such as a set screw, corresponding to each bushing piece and having a corresponding axial guide within the shaft collar is insertable within the corresponding axial guide and adjustable to exert pressure upon the bushing to push the bushing into or against the interface. The bushing may comprise a flat surface adapted to press against a grommet at the interface when the axially adjustable member is adjusted to exert pressure upon the bushing. The bushing may also or instead comprise a spacer wedge adapted to be inserted into a recess that comprises the interface between the shaft and surface in the absence of a grommet. The spacer wedge is adapted to be wedged between the shaft and an inner edge of the recess when the axially adjustable member is adjusted to exert pressure upon the bushing. The bushing may be axially reversible for use in the both the configuration with the grommet at the interface or the configuration without the grommet at the interface, and may comprise the flat surface on one axial side and the spacer wedge on an opposite axial side.

The shaft collar may comprise a shaft contact surface that is flat and may be adapted to be installed on the shaft with its axis aligned with the shaft axis. The tensioner may also comprise a shaft contact surface that is convex, the shaft contact surface further protruding from a shaft collar inner surface that is convex. The tensioner having the convex contact surface and convex inner surface may be installed on the shaft with its axis angled relative to the shaft axis. The flat surface of the bushing may extend from an inner radius adapted for contact with the shaft to an outermost radius of the bushing. The flat surface of the bushing may instead extend from the inner radius adapted for contact with the shaft to a ridge having an inner radius greater than an outer radius of the grommet, the ridge adapted to center the bushing on the grommet.

The tensioner may be particularly adapted for installation on a shaft of a side-view mirror of a vehicle, such as a pick-up truck. One embodiment of the side-view mirror tensioner may comprise a shaft collar split into two pieces; at least one connector for fastening the two pieces of the shaft collar together about the shaft; and a bushing split into two pieces. The bushing is adapted to contact an interface between the mirror shaft and the mirror mounting bracket or the mirror shaft and the mirror housing, and is adapted to be axially reversible for use in a configuration having a grommet at the interface or in a configuration having no grommet at the interface, the bushing comprising a flat surface on one axial side and a spacer wedge on an opposite axial side. At least one set screw corresponding to each bushing piece is threaded axially through the shaft collar to make contact with and exert pressure upon the bushing to push the bushing into or against the interface when the set screw is tightened.

The invention also comprises a method for increasing resistance of a shaft to rotation relative to a surface from which the shaft originates. The method comprises installing a tensioner on the shaft, the tensioner comprising a shaft collar split into at least two pieces; fastening means for joining the pieces of the shaft collar together; a bushing split into at least two pieces; and at least one axially adjustable member corresponding to each bushing piece and having a corresponding axial guide within the shaft collar. The method comprises positioning the pieces of the shaft collar and the pieces of the bushing together about the shaft with at least a portion of the bushing placed coaxially within the shaft collar, and the bushing placed adjacent an interface between the shaft and the surface from which the shaft originates. The pieces of the shaft collar are then joined together using the fastening means so that the shaft collar radially constrains the bushing and attaches snugly to the shaft. Finally, the axially adjustable members are axially adjusted within the corresponding axial guides to exert pressure upon the bushing to push the bushing into or against the interface.

In a method where the shaft comprises a mirror shaft for a side-view mirror assembly of a vehicle, the interface may comprise an interface between the mirror housing and the mirror shaft or an interface between the mirror shaft and a mirror mounting bracket on the vehicle, and the bushing may comprise a flat surface on one axial side and a spacer wedge on an opposite axial side. In such case, the method further comprises determining if the interface contains a grommet or no grommet; and aligning the bushing with the flat surface adjacent the interface if a grommet is present, or aligning the bushing with the spacer wedge adjacent the interface if no grommet is present.

DETAILED DESCRIPTION OF INVENTION

Figure 2:
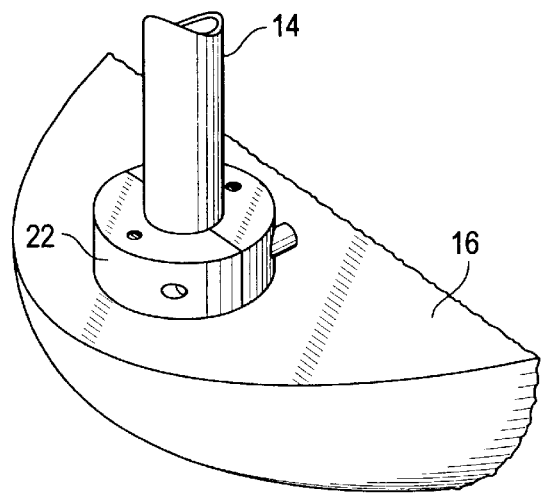
FIG. 2 illustration of a portion of the side-view mirror assembly of FIG. 1 with an exemplary mirror tensioner of the present invention attached.
Figure 3:
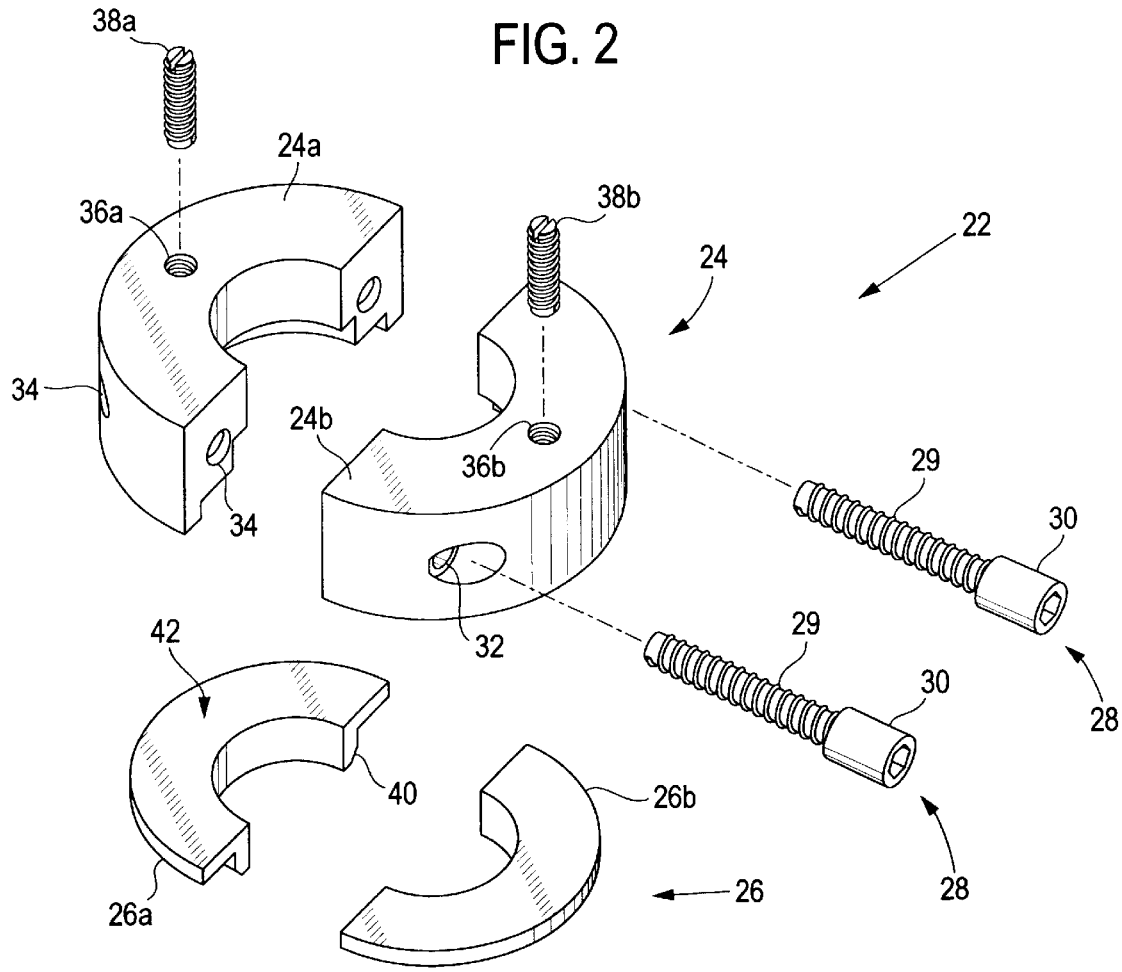
FIG. 3 exploded perspective view illustration of the mirror tensioner of FIG. 3.

The invention will next be illustrated with reference to the figures. The figures are intended to be illustrative rather than limiting and are included herewith to facilitate the explanation of the method of this invention. Referring now to FIG. 2, there is shown an exemplary mirror tensioner 22 of the present invention installed on side-view mirror assembly 10 at the interface between shaft 14 and mounting bracket 16. Referring now to FIG. 3, there is shown an exploded view of mirror tensioner 22, which comprises a shaft collar 24 and a bushing 26.

Both shaft collar 24 and bushing 26 are split into two halves, 24a and 24b, and 26a and 26b, respectively, so that the halves may be placed around the shaft of the mirror assembly without removing the shaft. The two halves are then joined together again using screws 28, such as socket-head cap screws. One half (24b as shown in FIG. 3) of shaft collar 24 typically has an unthreaded first crosswise hole 32 with a radius large enough that screw body 29 can slide in and out of the hole, but screw head 30 cannot. The other half (24a as shown in FIG. 3) of shaft collar 24 thus has a threaded hole 34 having a smaller diameter than hole 32 and having female threads for receiving the male threads of screw body 29. Other means may also be used to join the halves of the shaft collar together, such as clamps, pins, bolt and nut combinations, and any type of connector known in the art.

Shaft collar 24 also comprises at least two offset axial holes 36a and 36b into which set screws 38a and 38b, respectively, are threaded. Any type of axially adjustable member may be used instead of set screws.

Figure 4:
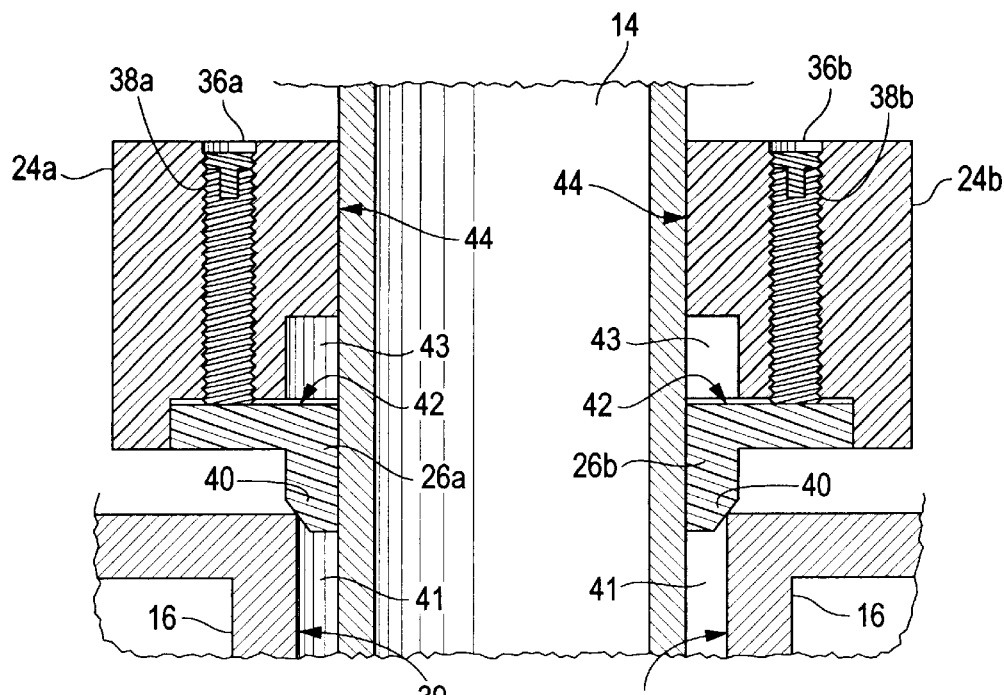
FIG. 4 is longitudinal-section illustration showing the mirror tensioner of FIG. 3 installed a side-view mirror assembly having no grommet at the interface between the shaft and the mounting bracket.

FIG. 4 shows an installation of tensionser 22 on a mirror assembly wherein the interface between shaft 14 and mounting bracket 16 does not comprise a grommet 20b. For use on an interface without a grommet, bushing 26 is installed around shaft 14 so that spacer wedge 40 portion of the bushing is wedged between shaft 14 and the inside edge 39 of recess 41 in mounting bracket 16 into which the shaft 14 is mounted, as shown in FIG. 4. Where the interface comprises a grommet 20a, the bushing is reversed so that flat surface 42 contacts the grommet. In the configuration with a grommet, spacer wedge 40 is received by recess 43 in shaft collar 24. Recess 43 allows bushing 26 to be axially received within shaft collar 24 without axially protruding from the shaft collar (as shown installed in FIG. 7).

Mirror tensioner 22 is installed by first placing the adjoining halves 26a and 26b of bushing 26 and adjoining halves 24a and 24b of shaft collar 24 together around shaft 14. If grommet 20a (or 20b, depending on which part of the mirror is being tensioned) is present, flat surface 42 of bushing 26 is mounted against the grommet; if there is no grommet, spacer wedge 40 is wedged between shaft 14 and mounting bracket 16. Shaft collar 24 is placed coaxially around bushing 26 so that at least a portion of the bushing is contained within and radially compressed by the shaft collar. As shown in FIG. 4, recess 46 (shown in FIG. 5) coaxially contains at least radially extended portion 47 of bushing 26. Shaft collar 24 is in axial contact with the respective surface of bushing 26 that is not adjacent the interface between shaft 14 and the bracket 16 (flat surface 42 as shown in FIG. 4), and halves 24a and 24b of the shaft collar are snugly joined together around the shaft using screws 28. This binds shaft collar 24 to shaft 14 and radially constrains bushing 26 between the shaft collar and the shaft. Next, set screws 38a and 38b are tightened to force bushing 26 against grommet 20a (or 20b) or, where no grommet is present, to force spacer wedge 40 of bushing 26 into recess 41, as shown in FIG. 4. Set screws 38a and 38b may be tightened to a point at which the resistance to adjustability of the mirror is acceptable to the user.

Figure 1:
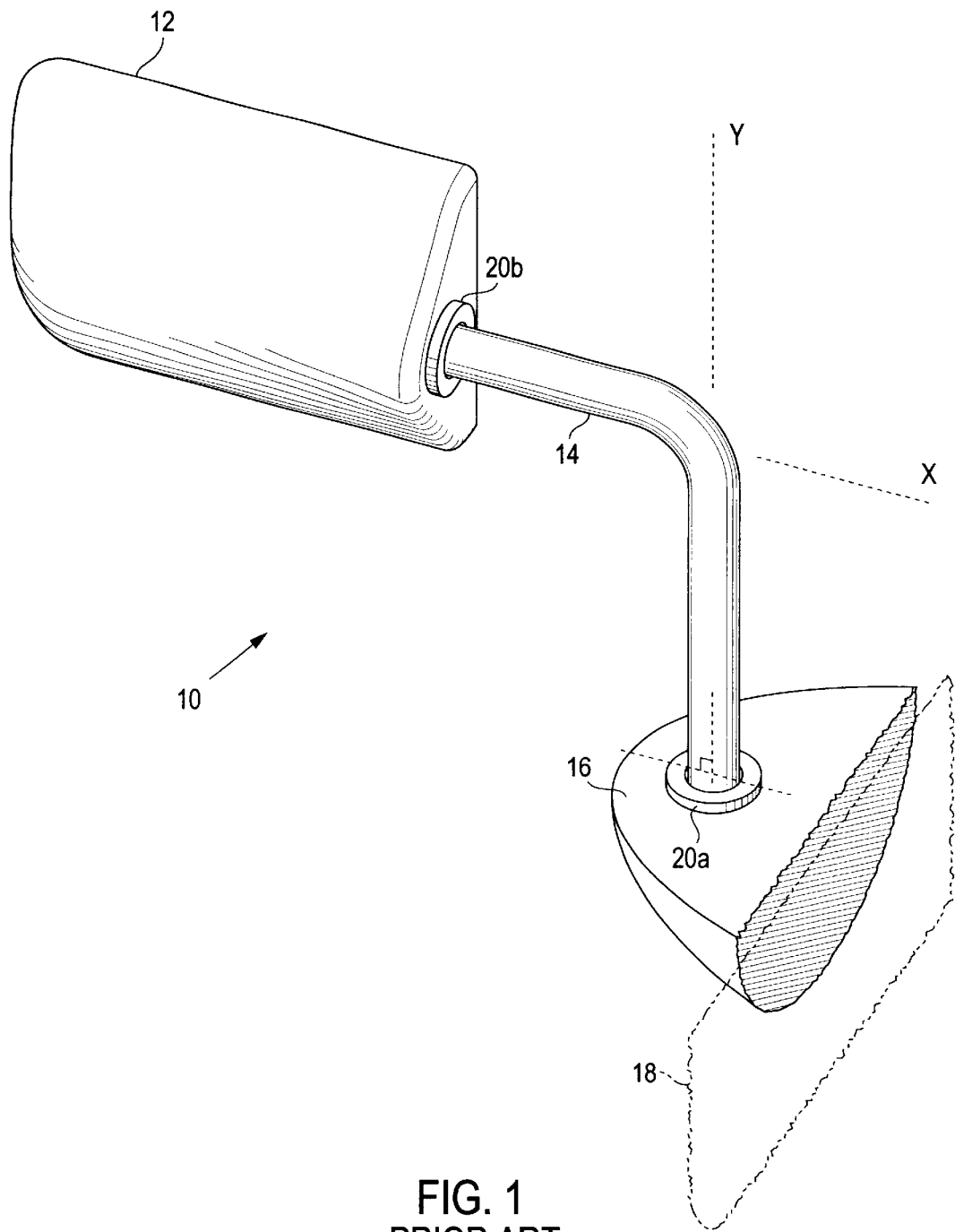
FIG. 1 is an illustration of an exemplary side-view mirror assembly of the prior art.
Figure 5:
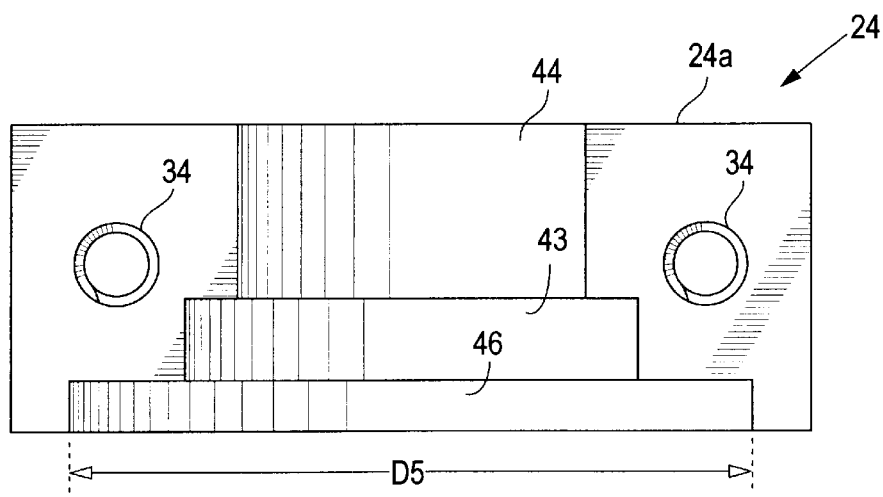
FIG. 5 is an end view illustration of one half of the shaft collar of FIG. 3.
Figure 6:
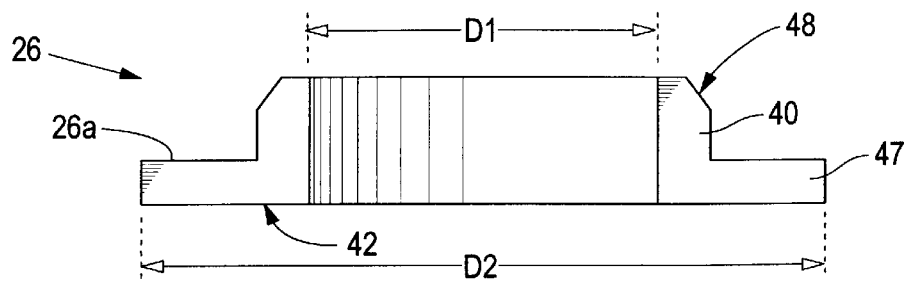
FIG. 6 is view illustration of one half of the bushing of FIG. 3

Referring now to FIG. 5, there is shown an end view illustration of half 24a of shaft collar 24, in which the shaft contact surface 44 of the shaft collar is flat. Referring now to FIG. 6, there is shown an end view illustration of half 26a of bushing 26 having a flat surface 42 extending from an inner diameter D1, adapted to be in contact with the shaft 14, to an outermost diameter D2. Although shown as a diameter in the figures, it should be understood that to the extent that the various elements may be split into two or more pieces, the individual pieces have a radius that corresponds to the diameter shown. Shaft collar 24 comprises recess 46 adapted to receive and radially constrain radially extended portion 47 of bushing 26 and further comprises recess 43 adapted to receive spacer wedge 40 when tensioner 22 is used in an application that has a grommet 20a (or 20b, as shown in FIG. 1). When installed, outermost diameter D2 or radially extended portion 47 of bushing 26a is radially constrained by inner diameter D5 of recess 46 of shaft collar 24a, regardless of the axial orientation of the bushing. As shown in FIG. 6, spacer wedge 40 of bushing 26 has a somewhat pointed lower end 48 to facilitate wedging.

Figure 7:
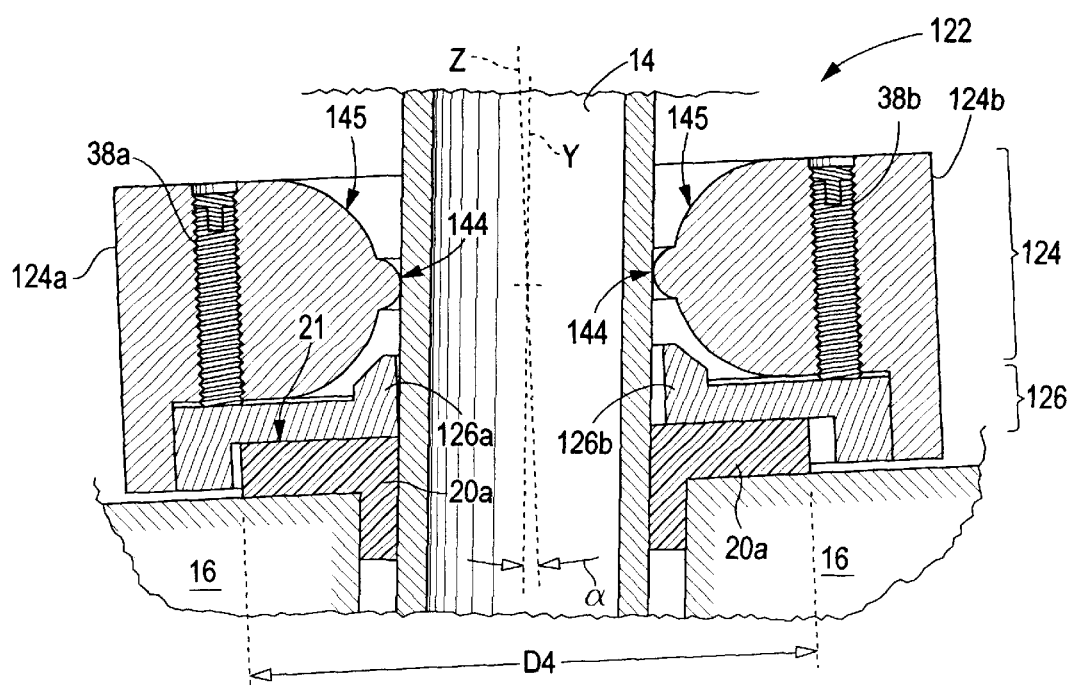
FIG. 7 is a cross-sectional illustration of another shaft collar and bushing embodiment, mounted on a shaft having a grommet at the interface between the shaft and the mounting bracket wherein the axis of the tensioner is angled relative to the axis of the shaft.
Figure 8:
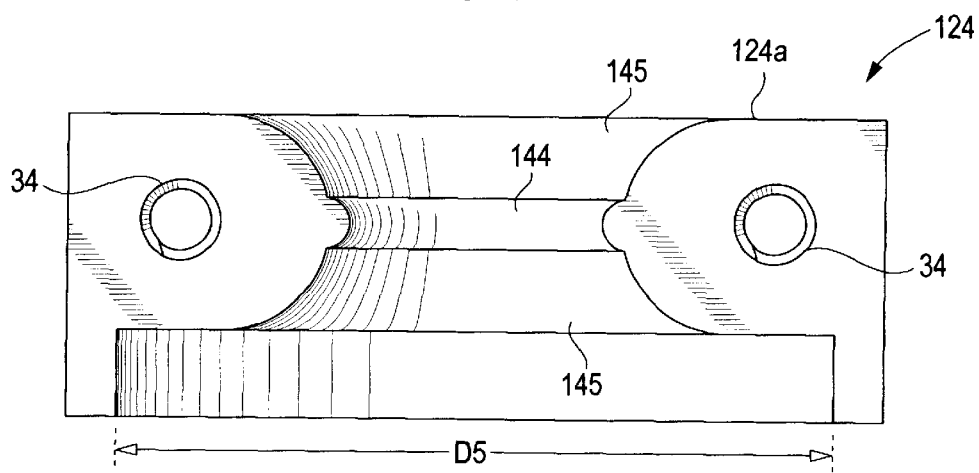
FIG. 8 is an end view illustration of one half of the shaft collar of FIG. 7
Figure 9:
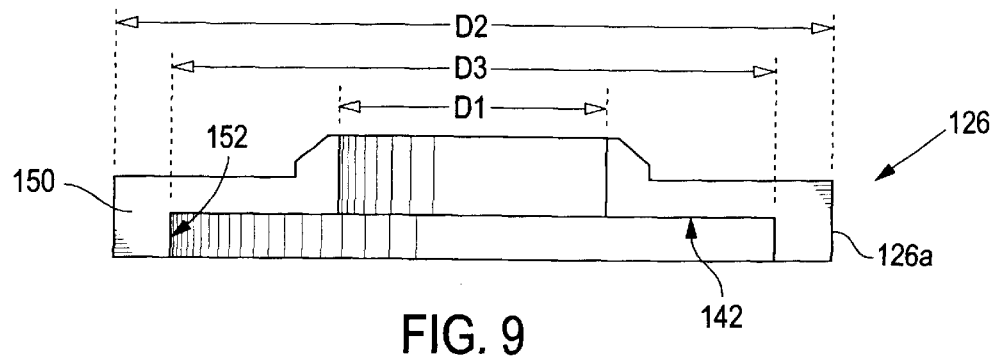
FIG. 9 is view illustration of one half of the bushing of FIG. 7.

In some circumstances, such as the assembly shown in FIGS. 1 and 7, the upper surface 21 of grommet 20a (or 20b) is angled at greater or less than 90° relative to axis Y (or X) of shaft 14. In such circumstances, an embodiment of the invention such as is shown in FIGS. 7–9 may be beneficial. Mirror tensionser 122 is adapted to be mounted flush with grommet 20a (or 20b) so that axis Z of the tensioner is at an angle α relative to axis Y of shaft 14, as shown in FIG. 7. As shown in FIGS. 7 and 8, shaft collar 124, comprising halves 124a and 124b, has a shaft contact surface 144 in the shape of a convex ring having a relatively minimal contact surface area as compared with surface 44 shown in FIG. 5. Inside surface 145 of shaft collar 124 may also be convex to allow a desired amount of swivel of tensioner 122 axis Z relative to shaft axis Y. As shown in FIGS. 7 and 8, convex surfaces 144 and 145 have cross-sections that are rounded and semi-circular, but any geometry may be used. Convex contact surface 144 having relatively minimal contact surface area enables the contact surface to "bite" into the shaft and hold the tensioner in place. The embodiment shown in FIGS. 7 and 8 is not limited to any particular type of use, however, and may be used where the relationship between shaft 14 and the bracket 16 is essentially perpendicular or angled from perpendicular.

FIGS. 7 and 9, show an embodiment of halves 126a and 126b of bushing 126 where flat surface 142 does not occupy the entire area from D1 to D2, but rather comprises an area bounded by D1 and ridge 150 having an inside edge 152 at a diameter D3 that is slightly greater than the outside diameter D4 of grommet 20a (or 20b) (shown in FIG. 7). Ridge 150 helps center bushing 126 on the grommet. Although shown in use in conjunction with shaft collar 124, centering bushing 126 may also be used with shaft collar 24. As installed, outermost diameter D2 of bushing 126 126a is radially constrained by diameter D5 of shaft collar 24 or 124.

The materials of construction for the tensioner of the present invention may be any materials known in the art, but in particular, materials suited for all-weather use, strength, and reasonable cost are preferred, such as plastic, as shown in FIG. 4, or aluminum, as shown in FIG. 7. The parts may be provided in any color or with any outward styling desired.

Although described specifically herein relative to sideview mirrors for a pick-up truck, the invention may be used on mirrors for any type of vehicle, and may be used for providing resistance to turning any shaft relative to a surface from which the shaft originates. Although the relationship of the shaft to the surface is essentially perpendicular or slightly off of perpendicular as shown in FIG. 1, the relationship may be more or less angled from perpendicular than depicted. Also, although shown split into only two pieces, the collar and bushing may be split into more than two pieces. The bushing may be split into more pieces than the collar. Likewise, although shown with two set screws, one for each piece of the split bushing, the tensioner may have more than two set screws (or other axially adjustable members), and more than one set screw for each piece of the split bushing. Although bushing 26 is shown herein with collar 24, and bushing 126 with collar 124, the bushing and collar designs may be mixed and matched.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A tensioner to provide resistance to rotation of a shaft relative to a surface from which the shaft originates, the tensioner comprising:
   a shaft collar split into at least two pieces;
   at least one connector for fastening the split pieces of the shaft collar together about the shaft;
   a bushing split into at least two pieces, the bushing adapted to contact an interface between the shaft and the surface from which the shaft originates and at least a portion of the bushing adapted to fit coaxially inside and be radially constrained by the shaft collar;
   at least one axially adjustable member corresponding to each bushing piece and having a corresponding axial guide within the shaft collar, each axially adjustable member insertable in the corresponding axial guide and adjustable to exert pressure upon the bushing to push the bushing into or against the interface.

2. The tensioner of claim 1 adapted for use in a configuration wherein the interface comprises a grommet, wherein the bushing comprises a flat surface adapted to press against the grommet when the axially adjustable member is adjusted to exert pressure on the bushing.

3. The tensioner of claim 2 in which the bushing is axially reversible, the axially reversible bushing comprising the flat surface on one axial side and a spacer wedge on an opposite axial side, the spacer wedge adapted to be inserted into the recess to be wedged between the shaft and an inside edge of the recess when the axially adjustable member is adjusted to exert pressure on the bushing.

4. The shaft tensioner of claim 3 wherein the shaft collar further comprises a recess adapted to axially receive the spacer wedge when the bushing is oriented with the flat surface facing axially away from the shaft collar.

5. The tensioner of claim 1 adapted for use in a configuration wherein the interface comprises a recess in the surface surrounding the shaft, wherein the bushing comprises a spacer wedge adapted to be inserted into the recess to be wedged between the shaft and an inside edge of the recess when the axially adjustable member is adjusted to exert pressure on the bushing.

6. The shaft tensioner of claim 1 wherein the shaft has a first axis and the shaft collar has a second axis, the tensioner adapted to be installed on the shaft with the first axis aligned with the second axis.

7. The shaft tensioner of claim 1 wherein the shaft has a first axis and the shaft collar has a second axis, in which the tensioner is adapted to be installed on the shaft with the second axis angled relative the first axis.

8. The shaft tensioner of claim 1 wherein the shaft collar comprises a shaft contact surface that is flat.

9. The shaft tensioner of claim 8 wherein the shaft has a first axis and the shaft collar has a second axis, in which the tensioner is adapted to be installed on the shaft with the first axis aligned with the second axis.

10. The shaft tensioner of claim 1 wherein the shaft collar comprises a shaft contact surface that is convex.

11. The shaft tensioner of claim 10 wherein the shaft collar further comprises an inner surface that is convex from which the shaft contact surface protrudes inwardly.

12. The shaft tensioner of claim 11 wherein the shaft has a first axis and the shaft collar has a second axis, in which the tensioner is adapted to be installed on the shaft with the second axis angled relative the first axis.

13. The shaft tensioner of claim 2 wherein the flat surface of the bushing extends from an inner radius adapted for contact with the shaft to a ridge having an inner radius greater than an outer radius of the grommet, the ridge adapted to center the bushing on the grommet.

14. The shaft tensioner of claim 2 wherein the flat surface of the bushing extends from an inner radius adapted for contact with the shaft to an outermost radius of the bushing.

15. The shaft tensioner of claim 1 wherein the collar and the bushing comprise plastic or aluminum.

16. The shaft tensioner of claim 1 wherein the tensioner is adapted for installation on a shaft of a side-view mirror of a vehicle.

17. The shaft tensioner of claim 1 wherein each axially adjustable member comprises a set screw and each axial guide in the shaft collar is a threaded hole adapted to receive one of the set screws.

18. A tensioner for installation on a side-view mirror assembly of a vehicle to provide resistance to adjustment of a mirror housing relative to a mirror shaft, or the mirror shaft relative to a mirror mounting bracket on the vehicle, the tensioner comprising:
   a shaft collar split into two pieces, each piece having at least one axial set screw hole;
   at least 2 screws for fastening the two pieces of the shaft collar together about the shaft;
   a bushing split into two pieces, the bushing adapted to contact an interface between the mirror shaft and the mirror mounting bracket or the mirror shaft and the mirror housing, at least a portion of the bushing adapted to fit coaxially inside and be radially constrained by the shaft collar, and the bushing adapted to be reversible, the bushing comprising a flat surface on one axial side and a spacer wedge on an opposite axial side; and
   one set screw corresponding to each set screw hole, each set screw axially adjustable within the set screw hole to exert pressure upon the bushing to push the bushing into or against the interface.

19. The shaft tensioner of claim 18 wherein the shaft collar comprises an inner surface that is rounded and a shaft contact surface that protrudes inwardly from the inner surface and is rounded.

20. The shaft tensioner of claim 19 adapted for use in a configuration wherein the interface comprises a grommet, wherein the flat surface of the bushing extends from an inner radius adjacent the shaft to a ridge having an inner radius greater than an outer radius of the grommet, the ridge adapted to center the bushing on the grommet.

21. A method for increasing resistance of a shaft to rotation relative to a surface from which the shaft originates, the tensioner comprising a shaft collar split into at least two pieces; fastening means for joining the pieces of the shaft collar together; a bushing split into at least two pieces; and at least one axially adjustable member corresponding to each bushing piece and having a corresponding axial guide within the shaft collar, the method comprising:
   a) positioning the pieces of the shaft collar and the pieces of the bushing together about the shaft with at least a portion of the bushing placed coaxially within the shaft collar and the bushing placed adjacent an interface between the shaft and the surface from which the shaft originates;
   b) joining the pieces of the shaft collar together using the fastening means so that the shaft collar radially constrains the bushing and attaches snugly to the shaft;
   c) axially adjusting the axially adjustable members within the corresponding axial guides to exert pressure upon the bushing to push the bushing into or against the interface.

22. The method of claim 21 wherein the shaft comprises a mirror shaft for a side-view mirror assembly of a vehicle, wherein the bushing comprises a flat surface on one axial side and a spacer wedge on an opposite axial side, step (a) further comprising:
   a1) determining if the interface contains a grommet or no grommet;
   a2) aligning the bushing with the flat surface adjacent the interface if a grommet is present, or aligning the bushing with the spacer wedge adjacent the interface if no grommet is present.

* * * * *